US010966081B2

(12) United States Patent
Hult et al.

(10) Patent No.: US 10,966,081 B2
(45) Date of Patent: Mar. 30, 2021

(54) MSISDN REGISTRATION

(71) Applicant: GIESECKE+DEVRIENT MOBILE SECURITY GMBH, Munich (DE)

(72) Inventors: Jorgen Hult, Tullinge (SE); Markus Haubner, Altomunster (DE); Nils Nitsch, Markt Schwaben (DE); Waleed Badawy, Munich (DE); Ulrich Huber, Munich (DE); Anders Kokeritz, Bromma (SE); Hrushikesh Chidley, Pune (IN); Rikard Forselius, Tyreso (SE); Gero Galka, Valley (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/956,944

(22) PCT Filed: Dec. 20, 2018

(86) PCT No.: PCT/EP2018/000578
§ 371 (c)(1),
(2) Date: Jun. 22, 2020

(87) PCT Pub. No.: WO2019/120610
PCT Pub. Date: Jun. 27, 2019

(65) Prior Publication Data
US 2021/0006969 A1 Jan. 7, 2021

(30) Foreign Application Priority Data
Dec. 22, 2017 (DE) .......................... 102017011961.9

(51) Int. Cl.
H04W 8/24 (2009.01)
H04W 8/26 (2009.01)
(Continued)

(52) U.S. Cl.
CPC ............... *H04W 8/26* (2013.01); *H04W 8/24* (2013.01); *H04W 4/60* (2018.02); *H04W 8/205* (2013.01); *H04W 12/35* (2021.01)

(58) Field of Classification Search
CPC ......... H04W 8/26; H04W 8/24; H04W 8/205; H04W 12/35; H04W 4/60
See application file for complete search history.

(56) References Cited

U.S. PATENT DOCUMENTS 10,412,577 B2 9/2019 Long
10,439,823 B2 10/2019 Park et al.
(Continued)

FOREIGN PATENT DOCUMENTS

EP 3247136 A1 11/2017
EP 3297309 A1 3/2018
(Continued)

OTHER PUBLICATIONS

"Reprogrammable SIMs: Technology, Evolution and Implications," CSMG: A TMNG Global Company, Sep. 25, 2012, 95 Pages.
(Continued)

*Primary Examiner* — Barry W Taylor
(74) *Attorney, Agent, or Firm* — Workman Nydegger

(57) ABSTRACT

A system for registering an MSISDN with a device hosting the UICC and in which the UICC is or can be operated includes a UICC provisioning server operated by an UICC different from the MNO. A Local Profile Assistant LPA is installed within the device or the UICC, and enables establishment of secured data sessions between the UICC and the UICC provisioning server. A modem is installed within the device or UICC. The modem enables communication of the device within a mobile network operator MNO mobile network. An MSISDN retrieval logic is associated with the
(Continued)

LPA. A logic is constructed to perform a retrieval sequence with the foregoing components and data.

6 Claims, 2 Drawing Sheets

(51) Int. Cl.
  *H04W 8/20* (2009.01)
  *H04W 12/30* (2021.01)
  *H04W 4/60* (2018.01)

(56) References Cited

U.S. PATENT DOCUMENTS

| | | | |
|---|---|---|---|
| 2013/0121483 A1* | 5/2013 | Murakami | H04W 8/183 |
| | | | 379/212.01 |
| 2016/0021529 A1 | 1/2016 | Park et al. | |
| 2017/0289788 A1 | 10/2017 | Lalwaney | |
| 2018/0123803 A1 | 5/2018 | Park et al. | |
| 2019/0053040 A1 | 2/2019 | Long | |
| 2019/0208405 A1* | 7/2019 | Park | H04W 8/205 |
| 2020/0052907 A1 | 2/2020 | Park et al. | |
| 2020/0404501 A1* | 12/2020 | Kang | H04W 12/08 |

FOREIGN PATENT DOCUMENTS

| | | |
|---|---|---|
| EP | 3340667 A1 | 6/2018 |
| WO | 2016167551 A1 | 10/2016 |
| WO | 2017041299 A1 | 3/2017 |

OTHER PUBLICATIONS

"RSP Architecture," GSM Association, Version 2.2, Sep. 1, 2017, 95 Pages.

"RSP Technical Specification," GSM Association, Version 2.2, Sep. 1, 2017, 264 Pages.

German Office Action from corresponding DE Application No. 102017011961.9, dated Aug. 3, 2018.

International Search Report and Written Opinion from PCT Application No. PCT/EP2018/000578, dated Apr. 12, 2019.

* cited by examiner

MSISDN REGISTRATION

FIELD OF THE INVENTION

The present invention relates to a system for registering an MSISDN associated with a device hosting the UICC and in which the UICC is or can be operated. The MSISDN being registered at a mobile network operator MNO server operated by an MNO. The system comprising the device, the UICC and a UICC provisioning server (DP+) are operated by an UICC owner or editor which is different from the MNO. The system further comprises a Local Profile Assistant LPA installed within the device or within the UICC. The LPA enables establishment and operation of secured data sessions between the UICC and the UICC provisioning server (DP+). The system further comprises a modem installed within the device or within the UICC. The modem enables communication of the device within a mobile network operator MNO mobile network. An UICC in combination with the present is to be understood as having a form factor that can be for example either of a plug-in UICC or SIM card, an embedded UICC or eUICC, or a (future) integrated UICC or iUICC.

PRIOR ART AND BACKGROUND OF THE INVENTION

A system as described above is known from documents [1][SGP.21] GSMA "RSP Architecture, Version 2.2, 1 Sep. 2017" and [2][SGP.22] GSMA "RSP Technical Specification, Version 2.2, 1 Sep. 2017" from the prior art.

One core element in the RSP Architecture according to [1] is the data preparation plus DP+;o server which combines in itself the functions of a data preparation server DP and the subscription management Secure router SM-SR. In previous version of [1], DP and SM-SR used to be two separate servers.

The DP+ has the two functions. The first function of data preparation plus DP+ is that of data preparation (also called: data generation) (formerly done by DP), that is the generation of Profiles for later download and installation to UICCs (in [1], [2] titled eUICC). The Profiles are generated at the data preparation plus DP+ in communication and interaction with MNO servers. Some Profile Data, the MNO Profile data, including for example IMSI and ICCID and other generated or static data, are known to the data preparation plus DP+ during data preparation. Other Profile related data, e.g. MSISDN, are not known at the data preparation plus DP+ during data generation. From a MNO network perspective, an MSISDN is a unique ID (identifier). Typically MSISDN will be assigned to the device at activation time of a Profile/IMSI (the Profile, particularly the IMSI, being installed in the UICC hosted in the device) within the HLR (Home Location Register).

Further known data and identifiers relevant in connection with UICC provisioning are (e.g. as known from [1], [2]): the eUICC-ID or briefly EID as an identifier of the UICC; the Integrated Circuit Card ID or briefly ICCID also as an identifier of the UICC.

The second function is that of download and installation to UICCs (formerly done by SMSR). A further component within the RSP Architecture according to [1] is the Local Profile Assistant LPA, which is installed in the device or in the UICC, and which is the software component as the terminal for exchanging data between the UICC provisioning server DP+, the UICC and the modem. Once a Profile downloaded and installed to a UICC is also activated in the UICC, also the HLR (Home Location Register) in the MNO server infrastructure registers the Profile as activated.

The modem of a device has access to the MSISDN of the device. In case an activated profile is present in the UICC, the MSISDN is registered in the device, and the modem can retrieve the MSISDN from inside the device. In case there is no active profile in the UICC, the modem can retrieve the MSISDN from an MNO background server. In both cases, the modem retrieves the MSISDN and from then on has access to the MSISDN.

In upcoming mobile network scenarios, particularly in M2M (machine-to-machine) scenarios, it would be desired that also the UICC provisioning server, such as the DP+ according to [1] and [2] is aware of the MSISDNs associated with devices to be managed. Particularly in push scenarios when a device shall be contacted by the UICC provisioning server for eSIM management, upon initiative of the UICC provisioning server, without the device previously seeking contact with the UICC provisioning server, the UICC provisioning server needs to be aware of the device MSISDNs.

The UICC provisioning server, such as DP+ according to [1], [2], is operated by an owner or editor of the UICC. The MSISDN is assigned to devices by the mobile network operator MNO who is different from the UICC owner or editor. The MNO and the UICC owner/editor each have their own server infrastructures. Thus an MSISDN known in the MNO server infra-structure is not necessarily known in the UICC owner/editor server infrastructure, particularly at the UICC provisioning server, such as DP+ according to [1], [2], but MSISDN must be notified to the UICC provisioning server (DP+).

So currently, there is not direct way for the UICC provisioning server (e.g. the DP+) to find out the MSISDN of a mobile device in the field without interfacing and interacting with the MNO server infrastructure. Especially in M2M subscription management scenarios, MSISDN can change frequently, and it is complex for the UICC provisioning server (DP+) system to keep track of the MSISDN currently associated with the managed mobile devices.

OBJECTIVE OF THE INVENTION

It is an object of the present invention to provide a system which enables notification of a device MSISDN to the provisioning server taking care of provisioning a UICC hosted in the device.

SUMMARY OF THE INVENTION

The object of the invention is achieved by a system with the features according to claim 1. Embodiments of the invention are presented in dependent claims.

In greater detail, the invention is achieved by a method, for a device including a UICC to be remotely managed, of registering the device's MSISDN with the UICC provisioning server, such as a DP+ backend server, without requesting information (profiles or other) from any MNO server.

The solution according to the invention has the advantage that the MSISDN of a subscription can be announced to the UICC/LPA and to the UICC provisioning server (e.g. DP+) of [1], [2]) at runtime without additional data import steps, and without additional new interfaces to the MNO infrastructure. Thus the interaction by the UICC provisioning infrastructure with the MNO infrastructure is reduced. The MSISDN value is thus shared between several key entities of the provisioning infrastructure which there are the UICC, the LPA and the UICC provisioning server (e.g. DP+).

According to a preferred embodiment, the MSISDN received at the UICC provisioning server is approved via a Challenge-Response approval sequence executed between the UICC provisioning server and the UICC, wherein the UICC provisioning server sends a challenge to the UICC and the UICC responds to the UICC provisioning server with a response including the MSISDN stored in the UICC. By this embodiment, the UICC provisioning server further implicitly gets a live confirmation that the MSISD is an active and working MSISDN. The MSISDN value is thus approved, shared and confirmed between several key entities of the provisioning infrastructure which there are the UICC, the LPA and the UICC provisioning server (such as DP+ according to [1], [2]). The approval sequence in the device is in these embodiments kind of triggered by an approval message (e.g. SMS) received from SMSC first at the modem and then further at the LPA.

A secured data session between the UICC and the UICC provisioning server (DP+) established by the LPA can particularly be an ES8+ session according to [1], chapter 2.1, FIG. 1: "Remote SIM Provisioning System, LPA in the Device", or FIG. 1: "Remote SIM Provisioning System, LPA in the eUICC".

After the UICC provisioning server has received the MSISDN (step 7) (and in case the EID, ICCID and/or other UICC identifier), the UICC provisioning server preferably further checks MSISDN (and in case EID, ICCID and/or other UICC identifier). In case of additional approval via challenge response using a random information, preferably these checks are done before the UICC provisioning server generates the random information (e.g. random number) for the approval sequence. Preferably, the UICC provisioning server stores the generated random information with itself. After completion of the approval sequence, the UICC provisioning server preferably deletes the random information.

BRIEF DESCRIPTION OF THE DRAWINGS

Embodiments of the invention will now be described with reference to the accompanying drawings, throughout which like parts are referred to by like references, and in which represents.

DETAILED DESCRIPTION OF THE INVENTION

Figure 1:
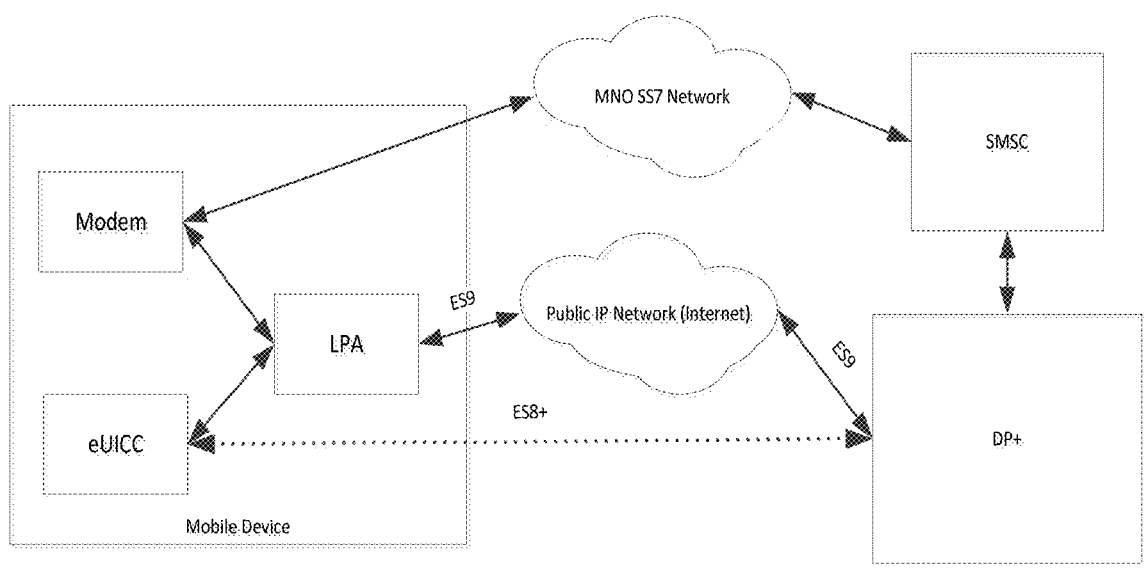
FIG. 1 a schematic infrastructure overview over a system suited for implementation of the invention.

FIG. 1 shows a schematic infrastructure overview over a system suited for implementation of the invention. The system comprises a mobile device in which a eUICC as an exemplary UICC is hosted. The device further comprises a Local Profile Assistant LPA and a modem. The system further comprises a DP+ according to [1], [2] as an exemplary UICC provisioning server DP+ and a message service Center, SMSC, associated with the provisioning server DP+. The modem and the message service Center, SMSC, communicate over a mobile network, for example a MNO SS7 network, the format of communication being preferably short message service SMS format. The eUICC, the modem and the LPA communicate inside the device in the known manner. The LPA and the provisioning server DP+ communicate via a public IP network, such as the Internet, via ES9 format as described in [1], [2]. Further, by the LPA, a ES8+ session according to [1] as an exemplary secured data session can be established between the UICC and the provisioning server DP+ can (dotted line), see [1] chapter 2.1, FIG. 1: "Remote SIM Provisioning System, LPA in the Device", or FIG. 1: "Remote SIM Provisioning System, LPA in the eUICC".

Figure 2:
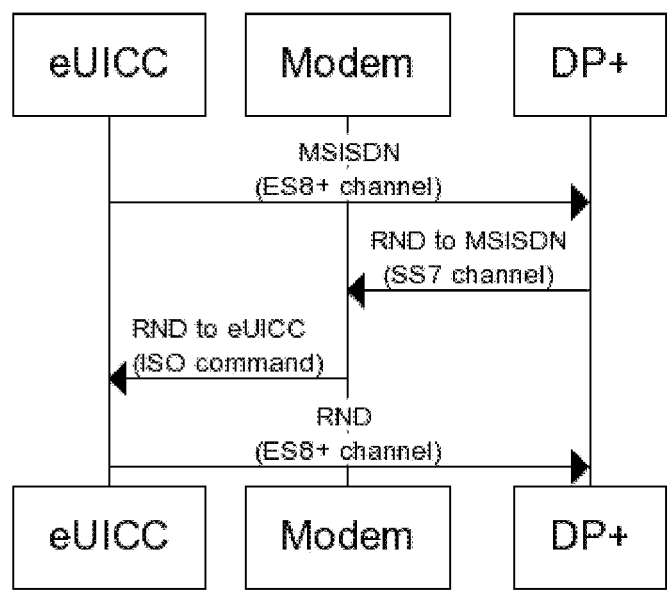
FIG. 2 a high level sequence diagram showing registering of an MSISDN from a UICC to a UICC provisioning server, and approval of a registered MSISDN via a challenge-response sequence, according to embodiments of the invention.

FIG. 2 shows a high level sequence diagram showing: first registering of an MSISDN from a UICC to a provisioning server DP+ via an ES8+ secured channel; then generation of a random number RND at the DP+ as a challenge; then sending the generated RND to the modem using the previously registered MSISDN as dial-in number via the mobile network, here a SS7 channel and using SMS format; forwarding RND from modem to eUICC; by eUICC sending the RND back to DP+ as a response of the challenge-response sequence, so as to achieve approval of the registered MSISDN.

Figure 3:
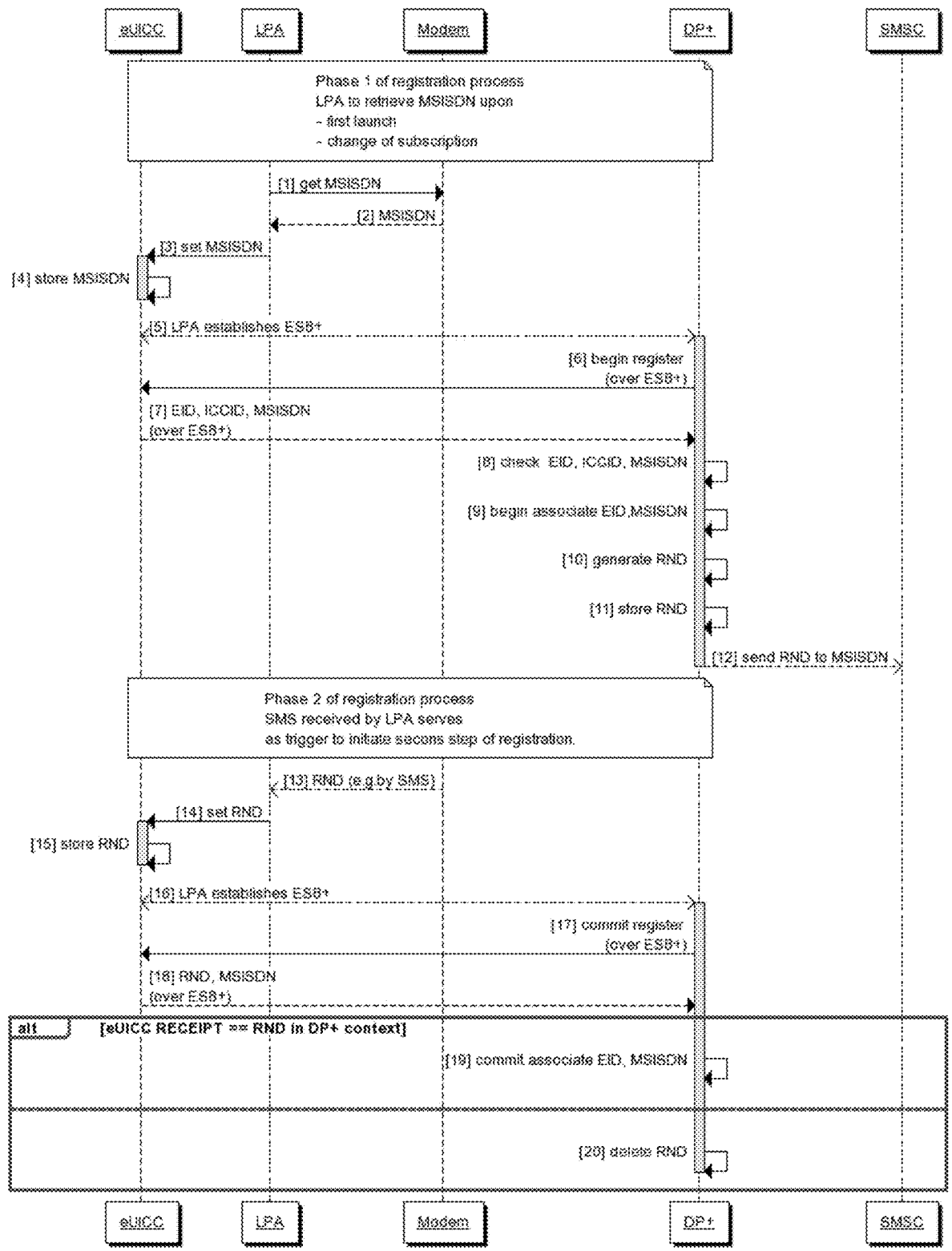
FIG. 3 a detailed sequence diagram showing registering of an MSISDN from a UICC to a UICC provisioning server, and approval of a registered MSISDN via a challenge-response sequence, according to embodiments of the invention.

FIG. 3 shows a detailed sequence diagram showing registering of an MSISDN from a eUICC, as an exemplary UICC, to a provisioning server DP+, as an exemplary UICC provisioning server, and approval of a registered MSISDN via a challenge-response sequence, according to embodiments of the invention. Steps (1)-(7) of FIG. 3 relate to the basic registration of an MSISDN, using a system as claimed in claim 1. Steps (8)-(11) relate to internal checking and data management steps at the provisioning server DP+, with step (1) being generation of a random number RND for the subsequent approval of MSISDN via a challenge-response method. Steps (10) and (12)-(18) relate to the additional approval of the registered MSISDN as claimed in claim 2, and further as claimed in the embodiments as claimed in claim 3.

What is claimed is:

1. A system for registering an MSISDN associated with a device hosting the UICC and in which the UICC is or can be operated, the MSISDN being registered at a mobile network operator MNO server operated by an MNO;
the system comprising the following elements:
the device,
the UICC,
a UICC provisioning server being operated by an UICC owner or editor which is different from the MNO,
a Local Profile Assistant LPA installed within the device or within the UICC, and enabling establishment and operation of secured data sessions between the UICC and the UICC provisioning server,
a modem installed within the device or within the UICC, and enabling communication of the device within a mobile network operator MNO mobile network, the modem having access to the MSISDN of the device,
wherein the system further comprises:
an MSISDN retrieval logic installed within or associated with the Local Pro-file Assistant LPA, and constructed to perform a retrieval sequence comprising the steps:
retrieving the MSISDN from the modem to the LPA,
providing the retrieved MSISDN from the LPA to the UICC and storing the MSISDN in the UICC in a non-volatile manner,
by the LPA, establishing a secured data session between the UICC and the UICC provisioning server, and by the UICC provisioning server, retrieving the MSISDN from the UICC via the established secured data session and registering the MSISDN as associated with the device hosting the UICC at the UICC provisioning server.

2. The system according to claim 1,
further comprising an MSISDN approval logic constructed to perform an approval sequence in which it is approved that the MSISDN retrieved according to steps is associated with the device hosting the UICC from which the MSISDN was retrieved;
wherein steps further comprise: by the UICC provisioning server, retrieving from the UICC an identifier of the UICC via the established secured data session and registering the identifier of the UICC as associated with the device hosting the UICC at the UICC provisioning server;
wherein the identifier of the UICC is either the EID or the ICCID, or both the EID and the ICCID, or a different suited identifier or set of identifiers of the UICC; and
wherein the MSISDN approval logic is constructed to perform the approval sequence using the identifier of the UICC and the MSISDN.

3. The system according to claim 2,
further comprising a message service Center, SMSC, integrated in or associated with the provisioning server, and operated by the UICC owner or editor, and constructed to send messages between the modem and the UICC provisioning server via the message service Center SMSC;
wherein the message service Center, SMSC, is part of the MSISDN approval logic; and
wherein the approval sequence comprises the steps:
at the provisioning server, generating and storing a random information, which is a random number or an information derived from a random number;
by the provisioning server, sending the generated random information to the message service Center, SMSC, using the MSISDN in an approval message which is either one of:
a short message SMS; or an USSD message; or
a different mobile network message form;
by the modem, receiving the random information received in the approval message and forwarding the random information to the LPA;
by the LPA, receiving the random information and forwarding the random information to the UICC;
at the UICC, storing the random information;
by the LPA, establishing a secured data session between the UICC and the UICC provisioning server, or using an already established secured data session between the UICC and the UICC provisioning server;
by the UICC provisioning server, retrieving the random information and the MSISDN from the UICC via the secured data session and checking if the random information retrieved in this present step matches the random information generated in step and if the MSISDN retrieved in this present step matches the MSISDN registered in step;
in case of match of both the random information and the MSISDN in step, at the UICC provisioning server, marking the MSISDN as approvedly associated with the UICC related to the identifier of the UICC.

4. The system according to claim 1, wherein the MSISDN retrieval logic is constructed to perform the retrieval sequence upon a trigger, the trigger being either one of:
a first launch of the device with the UICC in a mobile network;
a change of subscription achieved by activation of a previously non-activated Profile in the UICC.

5. The system according to claim 1 the step of retrieving the MSISDN is performed by:
retrieving the MSISDN:
from the device to the modem, in case an active Profile is present in the UICC; or from the MNO server to the modem, in case no active profile is present in the UICC.

6. The method according to claim 1, wherein the UICC has a form factor of either one of: a plug-in UICC card;
an embedded UICC;
an integrated UICC.

\* \* \* \* \*